United States Patent [19]

Schaefer

[11] Patent Number: 4,773,568
[45] Date of Patent: Sep. 27, 1988

[54] MANUALLY OPERATED SPREADER

[76] Inventor: Louis R. Schaefer, 2021 Van Buren St., Quincy, Ill. 62301

[21] Appl. No.: 125,878

[22] Filed: Nov. 27, 1987

[51] Int. Cl.$^4$ ............................................. A01G 25/14
[52] U.S. Cl. ................................. 222/175; 222/465.1; 222/547; 222/559; 239/374; 239/375; 239/652; 239/521
[58] Field of Search ............... 222/160, 161, 163, 167, 222/168, 169, 171, 172, 174, 175, 196, 196.1, 282, 287, 323, 459, 465.1, 480, 547, 559, 561, 564, 565; 111/10, 11, 72, 74, 75, 76, 92; 239/652, 653, 650, 689, 374–377, 521–523

[56] References Cited

U.S. PATENT DOCUMENTS

| | | | |
|---|---|---|---|
| 435,465 | 9/1890 | Taylor | 222/561 X |
| 657,363 | 9/1900 | Sanderson | 222/559 X |
| 923,023 | 5/1909 | Cranwell et al. | 239/650 X |
| 934,283 | 9/1909 | Case | 222/465.1 |
| 1,270,849 | 7/1918 | Lundstrom | 222/185 |
| 1,300,441 | 4/1919 | Marsa | 222/282 X |
| 1,476,655 | 12/1923 | Strickland | 222/175 X |
| 2,511,560 | 6/1950 | Bechmann | 239/652 |
| 2,582,207 | 1/1952 | Shaw | 222/559 X |
| 2,707,068 | 4/1955 | Williamson | 222/175 |
| 2,720,721 | 10/1955 | Reynolds, Jr. et al. | 222/175 UX |
| 2,748,996 | 6/1956 | Fritschi, Jr. | 222/547 X |
| 4,056,214 | 11/1977 | Day | 222/561 X |
| 4,596,363 | 6/1986 | Wellard | 222/465.1 X |

FOREIGN PATENT DOCUMENTS

| | | | |
|---|---|---|---|
| 413977 | 6/1946 | Italy | 222/175 |
| 478743 | 1/1938 | United Kingdom | 239/652 |

Primary Examiner—Kevin P. Shaver
Attorney, Agent, or Firm—Joseph W. Holloway

[57] ABSTRACT

A material spreader carried by the operator in one hand and operated by the same hand for oscillatory movement includes a hollow hopper, a spring-like carrying and operating handle attached to the hopper wall, and a material distributor mounted on the hopper exterior wall to receive material inertially ejected from the hopper through a gated aperture.

5 Claims, 2 Drawing Sheets

MANUALLY OPERATED SPREADER

BACKGROUND OF THE INVENTION

This invention relates to manually carried and operated devices for spreading seeds and particulate material such as fertilizer, salt, sweeping compound and the like upon lawns, gardens, sidewalks and floors.

Various devices adapted for spreading small seeds, lime and fertilizer compounds on lawns and gardens are well known. Such spreaders commonly include a hopper and an agitator-spreader mechanism which induces the material to fall from the bottom of the hopper and thereafter casts the material outwardly from the hopper onto the ground surface. Wheel-supported spreaders typically employ a wheel-driven rotary disk adjacent the bottom opening of the hopper to impart a radially directed force to particles of falling material to effect a spreading action. U.S. Pat. No. 1,270,849 discloses a hand-held fertilizer spreader having a carrying handle grasped by one hand and a rod positioned within the hopper operable by the other hand for agitating the material in the hopper and oscillating a spreading disc. Prior art spreaders typically include means for regulating the rate of discharge from the hopper by varying the size of an opening from the hopper.

Another type of known dispensing device for particulate material relies solely on gravitational force to cause the hopper contents to flow from the hopper to a discharge spout when a gate or valve therebetween is opened by the operator. In such devices the material is not scattered or spread upon a underlying surface, but is permitted to drop into a plant container or into a prepared hole in the ground surface. Dispensers of this kind are disclosed in U.S. Pat. Nos. 2,170,598; 3,106,322; 4,246,854; and 4,286,737.

However, the desirable features of the last mentioned type of dispensers are their handling ease and light weight due in large part to their lack of mechanical complexity. On the otherhand, such devices are not suitable for spreading particulate material in a pattern or swath in the manner of a heavier and bulkier wheeled spreader or a hand carried spreader of the type disclosed in the cited U.S. Pat. No. 1,270,849. A combination of the light weight and simplicity of a gravity-drop type dispenser with the spreading ability of a rotating disc type spreader would provide a device having advantageous characteristics not provided by either alone. However, a dilemma arises as to how to incorporate light weight, manual operability and structural simplicity in a device which functions to dispense evenly a wide range of materials in variable patterns.

In the absence of an efficient yet low cost manually held and operated spreader having the desirable characteristics just described, owners of wheeled spreaders or state-of-the-art manually carried spreaders are often unable or unwilling to undertake certain spreading tasks utilizing such cumbersome devices, but opt, instead, to attempt spreading materials by hand. Irregularities in coverage and in density of material inevitably result. Thus, only marginally acceptable results can be expected in such common hand spreading operations as sowing grass seed in small replacement areas, spreading ice-melting salt or sand on walkways, applying granular fertilizer or lime to the ground beneath overhanging foliage of shrubs, flowers or garden row plants, or scattering sweeping compound or grease absorbing material on floors inside buildings.

SUMMARY OF THE INVENTION

Accordingly, it is the general object of this invention to provide an improved manually held and operated spreader which obviates the aforedescribed shortcomings of prior art spreaders.

A principal objective is to provide a spreader which is conveniently carried by one hand, due to its compactness and light weight, and is easily operated by the same hand to achieve uniform spreading of a wide variety of materials. To this end, this invention contemplates a hollow cylindrical hopper attached to a flexible, elongated carrying handle with a distributor attached externally to the hopper for receiving material from the hopper and for thereafter directing such material in a desired pattern onto an underlying surface. In operation, the carrying handle is torsionally flexed by a back and forth motion of the operator's hand and wrist to force the hopper to oscillate rotatably about its longitudinal centerline. This reversible rotational movement of the hopper is imparted to the material mass disposed therein whereby the inertial force of the rotating material presses the same toward the hopper interior side wall with such force that some particles are impelled through a gated aperture in the side wall at a substantial velocity. The particles ejected through the aperture are received in a distributor having wall surfaces which then impact the particles to effect changes in their velocity and direction prior to exiting the distributor to fall upon an underlying surface. It will be appreciated that, contrary to the principal of operation of the more complex rotating disc-type spreaders mentioned above, a spreader according to the present invention is operable without relatively movable components or other associated mechanisms.

A related object is to provide a simple and lightweight spreader having an improved means for distributing various materials in a pattern resembling a segment of a circle whereby the particle density within such segment is substantially uniform and whereby the area and shape of the pattern is readily variable by the operator.

Another object is to provide a device for even spreading of very cohesive materials which tend to become lumpy and compacted inside a hopper thereby clogging the discharge aperture from the hopper. Most prior art devices require mechanical agitation of a compactable material mass to assure uninterrupted flow of particles from the hopper. In a novel manner, this invention includes a curved gate for adjustably regulating the flow of material through an aperture in the hopper wall which gate also functions to disintegrate material compacted inside the hopper and thereafter coacts with the adjacent hopper wall to isolate the loosened particles from the pressure of the remaining overlying material mass tending to cause recompaction. This advantageous combination of functions in a single structural component of a spreader leads to reduction in design complexity and weight.

Yet another object is to provide an improved handle for a manually operated spreader the action of which may be likened to a torsion bar or spring. The base of the handle is attached to the cylindrical wall of the hopper in diametric opposition to the aforedescribed distributor to counterbalance the weight of the distributor. The elongated handle shank projects upwardly from its point of attachment and is curved inwardly toward the longitudinal centerline of the hopper. At its free upper end the handle terminates in a hand-held segment for oscillating the handle together with the hopper and its contents. This segment is bent to lie in a plane which is generally normal to the longitudinal centerline of the hopper and intersects the same so that the twisting force of the operator's hand is effectively applied to rotate the hopper about an axis which generally coincides with its longitudinal centerline and which includes the center of gravity of the entire spreader and its contents. Thus the selected point of attachment and the configuration of the handle contrubute to the smoothness and regularity of the hopper's oscillatory movement.

A still further object is to provide a manually carried and operated spreader of simple design which can be manufactured at very low cost, is light in weight and small in size, is easily cleaned and maintained, and yet is sufficiently rugged to resist damage due to rough handling in use and storage.

These and other advantageous features of this invention will become apparent and the invention will be best understood and fully appreciated by having reference to the following detailed description of an embodiment of the invention taken in conjunction with the accompanying drawings.

DETAILED DESCRIPTION OF THE INVENTION

Figure 4:
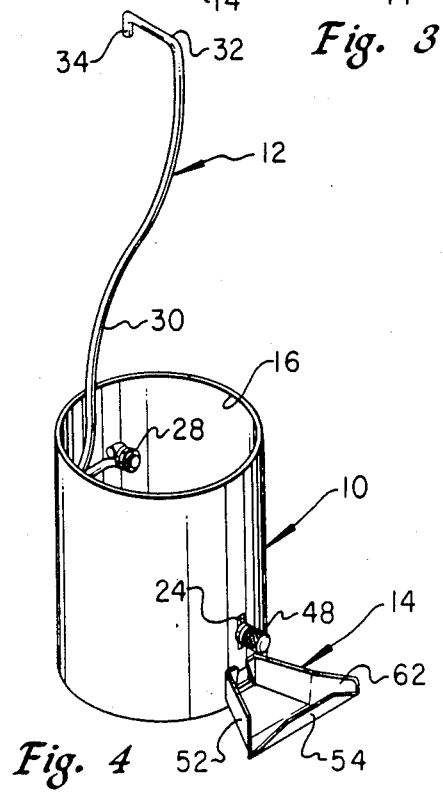
FIG. 4 is a perspective view of the invention.

As viewed in FIG. 4, the embodiment of the invention shown in the drawings generally includes a hopper 10 for receiving and storing spreadable material, a handle 12 for carrying and operating the spreader and a distributor 14 for directing material ejected from the hopper onto a surface underlying the spreader.

Figure 2:
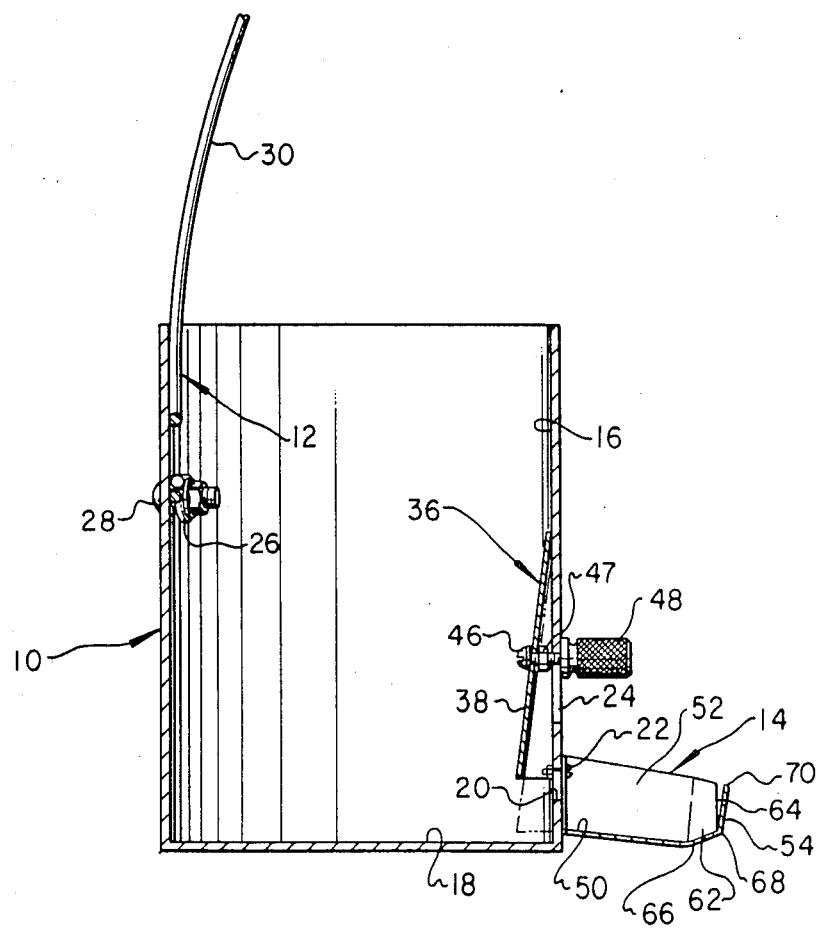
FIG. 2 is a cross-section taken along line 2—2 of FIG. 1.
Figure 3:
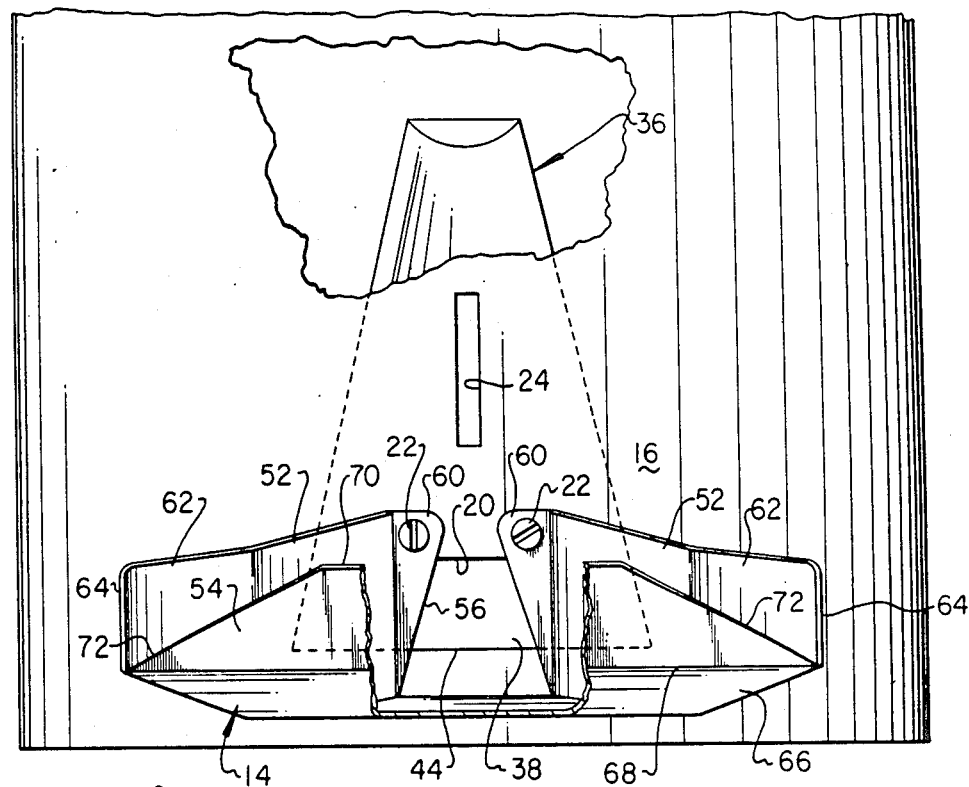
FIG. 3 is a fragmentary front elevation view showing details of the distributor and the gate member.

The hopper 10, as best seen in FIGS. 2 and 3, comprises a right cylinder open at its top and having an upright side wall 16 and a transverse bottom wall 18. The side and bottom walls are made of a thin sheet metal or plastic which is light in weight yet rugged enough to resist denting or breaking under normal usage. The dimensions of the hopper, hence its volume, is preferably limited so that the weight of a full load of material will not detract from the spreader's primary purpose as a hand held and operated device. In this regard it has been determined that the hopper capacity should be limited to about three dry quarts.

Proximate the hopper bottom wall 18, the cylindrical side wall 16 has an aperture 20 therethrough which may be square or rectangular in shape and opens from the hopper interior to what shall be hereinafter considered the exterior front of the hopper. The distributor 14 is attached to the front of the hopper wall 16 in alignment with the aperture 20 by suitable fasteners 22 which penetrate the distributor and hopper walls. An elongated vertical slot 24, best seen in FIG. 3, opens through the front of the hopper wall 16 above and in vertical alignment with the aperture 20 for a purpose to be described.

The handle 12 is attached to the interior rear wall of hopper 10 in a location diametrically opposed to the distributor 14. The lower portion of the handle 12 is bent to form oppositely extending anchoring eyes 26 through which are inserted threaded fasteners 28 which penetrate aligned holes in the wall 16 and coact with the eyes 26 to secure the handle 14 to the interior rear wall 16 of hopper 10 in an upwardly extending position illustrated best in FIG. 4.

The handle 12 is preferably fabricated by bending a thin, round member such as steel alloy wire. Such wire should be of sufficient cross-section and strength to provide a torsion bar or torsion spring action contemplated by this invention and yet be able to resist permanent deformation due to the substantial loads and forces applied to the handle during normal operation of the spreader.

Figure 1:
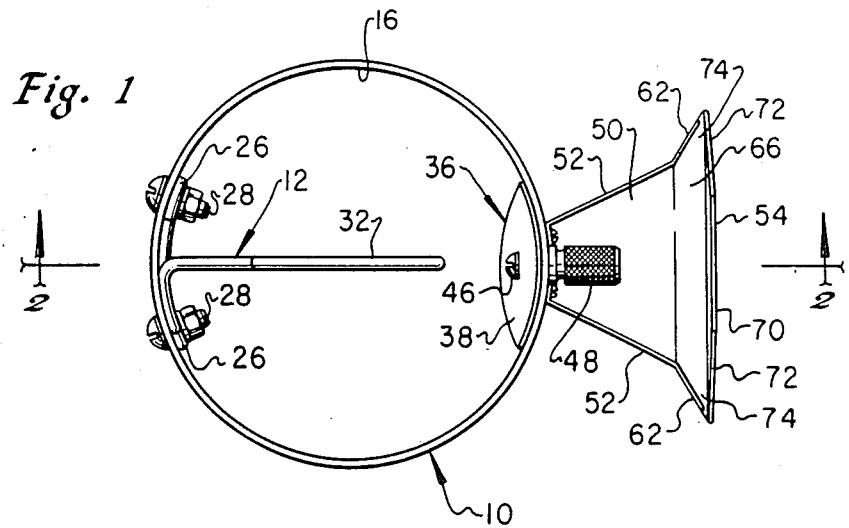
FIG. 1 is a top plan view of the invention.

As best shown in FIGS. 1 and 4, a shank portion 30 of handle 12 extends between the anchoring eyes 26 and a grip 32 formed at the upper free end of the shank. The arcuately bent shank projects radially inwardly from its point of attachment to wall 16 to an extent whereby the upper portion of the shank extends well beyond the longitudinal centerline of the hopper 10. The grip 32 is bent at an acute angle to the shank 30 and lies in a plane generally normal to the hopper's longitudinal centerline. Preferably the midpoint of the grip 32 lies on the longitudinal centerline of the hopper 10. To assist the operator in holding and twisting the handle 12, the grip has a downturned end 34 and may be thinly coated with a slip-resistant material.

A gate 36 is slidably mounted in bearing relation with the interior front wall 16 of the hopper 10 and overlies some portion of the aperture 20 as shown in FIGS. 2 and 3. The gate 36 functions to increase or reduce the effective area of the aperture 20 in a valve-like fashion whereby the volume of material ejected from the interior of the hopper 10 to the distributor 14 may be varied selectively depending upon such factors as the particle size and condition of the material and the desired particle density in the spread pattern.

Figure 5:
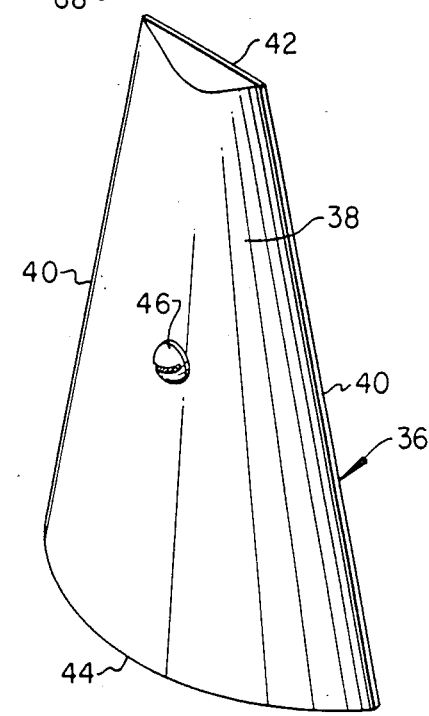
FIG. 5 is a perspective view of the gate mamber.

As illustrated in FIG. 5, the gate 36 comprises a generally truncated conical segment having a curved wall 38, side edges 40, a top edge 42 and a bottom edge 44. The gate is made of thin sheet metal or plastic and has an aperture intermediate the top edge 42 and the bottom edge for receiving a slot-headed bolt 46, or the like, for mounting the gate to the hopper wall 16 in the manner shown in FIGS. 1 and 2. The bolt is secured to the gate by a nut 47 and the threaded shank of bolt 46 extends through the elongated slot 24 for attachment to a threaded knob or nut 48. To adjust the effective size of the hopper aperture 20, the operator shifts the knob 40 within the slot 24 whereby the attached gate may be moved as desired between the fully open position shown in FIG. 2 in full lines and the fully closed position shown in broken lines. FIG. 3 illustrates the gate 36 in an intermediate position wherein the aperture 20 is approximately half open. The gate is secured against unintended movement relative to the hopper wall 16 by tightening the knob 48 to draw the gate side edges 40 and top edge 42 firmly against the hopper wall.

For a purpose to be described, the gate 36 is mounted inside the hopper 10 with its concave conical wall surface 38 facing the concave cylindrical wall surface 16 of the hopper. Thus a chamber is formed between the walls of the hopper 10 and the gate 36 which opens downwardly toward that portion of the hopper interior which is immediately adjacent the aperture 20. Material disposed within this hopper interior portion is shielded by the gate 36 to a substantial degree from the weight of overlying material which would otherwise bear outwardly and downwardly tending to compact and clog such material which is about to be ejected through aperture 20. The radius of curvature of the gate's bottom edge 44 generally coincides with the radius of the hopper wall 16.

The distributor 14 comprises a specially shaped receptacle open at its top and having a partially flat bottom wall 50, tapering side walls 52 and a front wall 54. A major segment of each side wall tapers inwardly toward a slot 56 in a rear wall defined by a pair of inwardly bent tabs 60. The tabs 60 are secured by the previously mentioned fasteners 22 to the exterior front wall 16 of the hopper; and, these tabs taper to overlie partially the aperture 20, as best seen in FIG. 3. The remaining forward segments 62 of the side walls 52 are flared outwardly from the centerline of the distributor and terminate in front edges 64. The bottom wall 50 is connected to the front wall 54 by a transitional, upwardly sloped wall 66 which joins with front wall at its bottom edge 68. The front wall 54, which projects slightly forwardly from vertical, is trapezoidal in shape, as shown in FIG. 3, having a top edge 70 opposite edge 68 and sloped side edges 72. Generally wedge-shaped surface areas 74 of the sloped wall 66 are formed between first lines defined by the intersections of the sloped wall 66 with the flared segments 62 of side walls 52 and second lines defined by the intersections of the sloped wall 66 with the bottom edge 68 of the front wall 54. The flared side walls 62 and the sloping portions of the front wall 54 extend upwardly from the just described surfaces 74 and coact therewith to define tapered openings or chutes which extend outwardly and forwardly from the interior of the distributor 14. The distributor may be stamped from lightweight sheet metal and thereafter processed by a forming die to shape the various bottom and wall surfaces described above.

Having disclosed in detail the structure of one preferred embodiment of the invention, the operation of the spreader will now be described.

Prior to loading the hopper 10 with material for spreading, the gate 36 is adjusted and secured by means of knob 48 to provide the desired rate of flow of material from the hopper to the distributor 14. Generally, the rate of flow is reduced for small particles such as small seeds and fine sand while the gate is fully opened to maximize the flow rate for large particles such as rock salt. As the operator gains experience in spreading various materials, the gate setting can be optimized for any material having consideration for the size and shape of the spreading pattern and the particle density desired.

After the gate 36 is adjusted and material is loaded into the hopper 10, the operator grasps the handle grip 32 and moves the grip back and forth with his hand and wrist in a plane generally parallel to an underlying surface. The operator will quickly recognize that the shape and size of the spread pattern produced and the density of particles in the pattern are determined by several operational factors as well as the position of the gate 36. Assuming the distance of the hopper above a surface is maintained relatively constant, the distribution of particles ejected forwardly and laterally from the hopper, hence the spread pattern, is primarily controlled by the angle through which the hopper is oscillated and the speed of such oscillations. For example, a suitable spread pattern for seeding large lawn areas is best achieved by holding the hopper at a substantial distance from the ground surface and operating the handle in as wide an arc and at the highest oscillatory speed permitted by the operator's ability and comfort. On the other hand, where fertilizer is to be applied under and around shrubs or flowers, the hopper may be held close to ground level and the handle oscillated more slowly and in a narrow arc to direct the particles immediately forwardly of the distributor near the base of the plants.

After brief usage of the spreader, an operator will have gained sufficient experience regarding gate settings, speeds of rotation and degrees of oscillatory travel to have the proficiency required to spread many types of materials in any desired pattern and density.

While the basic technic of using the spreader is simple and easily learned, certain physical principals of operation involved in the invention will be described to afford a better understanding and appreciation of the structural and operational improvements and benefits of the invention vis-a-vis prior art spreaders.

In order that the oscillation of the hopper 10 and its contents be as smooth and regular as possible, the handle 12 and the distributor 14 are attached to the hopper wall 16 at diametrically opposed locations whereby the moments of inertia of the handle and the distributor about the longitudinal centerline of the hopper will be approximately counterbalanced. To assure that the forces applied by the operator's hand to the grip 32 will produce oscillatory movement of the hopper substantially about its longitudinal centerline, the handle shank 30 is curved as aforedescribed to locate the midpoint of the grip 32 on or near the hopper's longitudinal centerline. While not desiring to be bound to any particular theory of operation, it is believed that the resultant of the hand-applied forces acts upon the midpoint of the grip 32 causing the hopper to oscillate on an axis which corresponds very nearly to its geometric longitudinal centerline which passes through the center of gravity of the combined masses of the spreader assembly and any material located in the hopper. Experimentation shows that, if the midpoint of the handle grip 32 is otherwise located, erratic hopper oscillation and piling up of material against a portion of the hopper wall 16 are produced. Both of these unwanted conditions cause uneven flow of material from the hopper and lead to unacceptable variations in particle distribution within the spread pattern.

The torsion spring effect of the handle shank 30 is also suprisingly beneficial to the efficient operation of the spreader. Since the ejection of material from the hopper 10 through the aperture 20 is induced by the inertia of rotating material particles, evenness in particle discharge rate is also probably enhanced by the spring effect of the shank 30. Thus, as the movement of the grip 32 is periodically arrested by the operator's hand and wrist, the momentum of the spreader combined with the momentum of material disposed therein, the latter being coupled at least in part to the spreader by frictional drag between the hopper walls 16 and 18 and the material bearing thereagainst, causes the shank 30 to twist in a spring-like manner. The potential energy in the shank is thereafter released as kenetic energy as the shank begins to return to a stable condition. This event is believed to occur more or less simultaneously with the application of energy by the operator tending to twist the shank in the same direction. This additive application of spring energy and operator energy to the hopper causes it to accelerate from a fully arrested position in a rapid, flipping manner which assists the operator in sustaining hopper oscillation with less fatigue than would occur if the shank were torsionally inflexible. It is also believed that the shank 30, due to its ability to store and thereafter release to the hopper considerable energy, tends to modify the periodic deceleration and acceleration of the hopper in a beneficial manner whereby the material in the hopper is more or less cushioned from jerky stops and starts so that a substantial part of the rotary driving force supplied by the hopper will be frictionally coupled to the material therein without complete and prolonged decoupling each time the hopper reverses direction. If total decoupling were to occur for any reason, the hopper would oscillate aimlessly about its contents without imparting that inertial force to the material required to eject particles from the hopper.

From the foregoing explanation of the spreader's operation, it will be appreciated that the location and shape of the handle as well as the spring characteristic of the handle shank 30 serves to sustain hopper osillation and inertial pressure of material against the hopper wall 16 thereby producing a flow of material particles through the aperture 20 at a relatively constant volume and speed into the receptacle defined by the distributor 14.

Turning now to the operation of the distributor 14, its principal functions are twofold; namely, to impact and accelerate the material particles ejected thereinto through the aperture 20 and thereafter to discharge the particles from the interior of the distributor over and to the sides of the trapezoidal distributor front wall 54. The ejected particles received in the box-like distributor interior tend to travel forwardly in a loose, fluid-like stream across the bottom wall 50 and up the sloped wall 66 toward the upstanding front wall 54. However, the energy of such particles is so reduced by the time they approach the front wall 54 that, without some means to increase their velocity, only a portion of these particles will have sufficent remaining momentum after impacting the front wall to bounce over the same. As the side wall segments 52 and 62 oscillate laterally, their upright surfaces impact the stream of particles flowing therebetween and accelarate the particles in a direction generally normal to the impacting surfaces. Thus, the sidewalls of the distributor constitute what may be considered paddles impacting the particle stream whereby forces are applied to the particles in magnitudes and directions which drive the particles sharply toward the front wall 54.

While not desiring to be held to a particular theory of operation, it is believed that the individual particles impacted by the sidewalls are invested with varying amounts of energy and that a portion of the particles will travel at speeds and in directions which will propel the same against and thence over the top edge 70 of the front wall 54 while other slower-speed particles will be propelled toward and over the sloped edges 72 or toward and through the aforedescribed tapered chutes defined by the walls 54, 62 and 74. While this theroy of operation is somewhat speculative and may be in some respects incomplete or inaccurate, practical experimentation has been employed to refine the shapes, sizes and relationships of the structural elements of the distributor 12 so that outstanding spreading results are achieved in actual application of the invention. Thus, it has been observed that casting material particles from the distributor in the aforedescribed manner whereby the individual particles are given different final velocities and directions creates a distribution pattern on an underlying surface throughout which the particle density is highly uniform. This beneficial result is not achieved in the case where the described distributor is omitted since the particle density observed showed a very substantial variation, particularly near the lateral extremes of the spread pattern.

The hereindescribed gate member 36 serves an obvious metering function whereby the material contained in the hopper 10 flows through the aperture 20 at a predeterminable rate. The gate's cooperation with the hopper wall 16 to eliminate or reduce compaction of material underlying the gate wall 38 has been explained above. Yet another function of the gate is to act as an agitator within the hopper to maintain the looseness or fluidity of that portion of the material near the hopper wall surface which is impacted by the gate as the hopper oscillates. There will be some unavoidable relative movement between the material mass and the hopper wall 16; and, such slippage usually occurs during the reversal of hopper rotation. During such periods of relative movement, the gate 36, which is fixed to the hopper wall 16 and projects radially inwardly into the material mass, will impact and agitate the material in a beneficial manner. As the material is inertially pressed under the bottom edge 44 of the gate for exiting the hopper through aperture 20, relative movement between such edge and the underlying material will cause the edge to slice through and disintegrate any unwanted clumps in the material prior to being ejected into the distributor for spreading. Since the gate 36 produces sufficient agitation to maintain material flowability and also breaks up clumps inside the hopper, the need for provision of a discrete agitator mechanism is eliminated together with the cost and weight of such mechanism.

Having described in detail the structure and operation of the embodiment of the invention illustrated in the drawings, it will be appreciated that the handle 12, the distributor 14 and the gate 36 each contribute to the realization of the objects set forth and coact in a novel and advantageous manner to provide a simple, lightweight, inexpensive device which demonstrates flexibility in application and good results in its principal function as a spreader.

It will also be apparent to those acquainted with the design and manufacture of spreading devices that various changes in size, shape and materials as well as specific details of the illustrated construction may be made without departing from the scope and spirit of the invention.

What I claim as my invention is:

1. In a spreader for particulate material including:

a hopper having an upright cylindrical wall and a longitudinal centerline;

aperture means in said wall through which material is ejected from said hopper in response to oscillation of said hopper; and, flexible handle means connected to said wall and extending upwardly therefrom for carrying said hopper and for oscillating said hopper about said centerline; the improvement wherein:

said handle means comprises an arcuate shank bent to intersect and extend beyond said centerline and terminating in a manual grip; and, said shank comprises an elongated torsion spring.

2. The spreader defined in claim 1, together with:
box-like distributor means connected to said wall in alignment with said aperture means for receiving a stream of material ejected from said hopper;
said distributor means having upright surface means between which said material stream moves for impacting said material stream as said surface means are oscillated laterally in a paddle-like manner in response to torsional flexing of said spring.

3. The spreader defined in claim 2, wherein:
said distributor means and said handle means are connected to said wall in diametrically opposed relationship whereby the respective moments of inertia of said handle means and of said distributor means substantially counteract one another when said hopper is oscillated.

4. The spreader defined in claim 2, wherein, said distributor means includes a trapezoidal front wall facing said aperture means and tapered chutes opening from the interior of said distributor means to either side of said front wall.

5. The spreader defined in claim 2, together with:
gate means slidably mounted on said wall for adjustably regulating the flow of material through said aperture means;
said gate means having a concave conical wall facing the interior cylindrical wall of said hopper and coacting therewith to define a chamber therebetween.

* * * * *